(12) United States Patent
Kassai et al.

(10) Patent No.: US 7,419,181 B2
(45) Date of Patent: Sep. 2, 2008

(54) FOLDABLE CARRIAGE BODY FOR CARRYING A SEAT

(75) Inventors: Kenzou Kassai, Osaka (JP); Ichiro Ohnishi, Nara (JP)

(73) Assignee: Aprica Ikujikenkyukai Aprica Kassai Kabushikikaisha, Osaka-shi (JP)

( * ) Notice: Subject to any disclaimer, the term of this patent is extended or adjusted under 35 U.S.C. 154(b) by 0 days.

(21) Appl. No.: 11/491,380

(22) Filed: Jul. 20, 2006

(65) Prior Publication Data

US 2007/0052209 A1    Mar. 8, 2007

(30) Foreign Application Priority Data

Sep. 7, 2005    (JP)    ............... 2005-259492

(51) Int. Cl.
*B62B 7/08* (2006.01)

(52) U.S. Cl. ...................... 280/642; 280/650

(58) Field of Classification Search ................ 280/639, 280/642, 644, 647, 648, 650, 657, 658, 47.38, 280/47.4; 297/94
See application file for complete search history.

(56) References Cited

U.S. PATENT DOCUMENTS

| | | | | |
|---|---|---|---|---|
| 4,265,466 A | * | 5/1981 | Kassai | ........................ 280/648 |
| 4,272,100 A | * | 6/1981 | Kassai | ........................ 280/650 |
| 4,398,748 A | * | 8/1983 | Duvignacq | .................. 280/644 |
| 5,388,852 A | * | 2/1995 | Bigo et al. | .................. 280/642 |
| 5,553,885 A | | 9/1996 | Chang | |
| 5,662,339 A | * | 9/1997 | Svendsen et al. | .............. 280/30 |
| 5,938,230 A | | 8/1999 | Huang et al. | |
| 6,276,709 B1 | * | 8/2001 | Chen et al. | .................. 280/650 |
| 2004/0090045 A1 | | 5/2004 | Kassai et al. | |
| 2004/0164523 A1 | | 8/2004 | Kassai et al. | |
| 2004/0169352 A1 | | 9/2004 | Kassai et al. | |

FOREIGN PATENT DOCUMENTS

| | | |
|---|---|---|
| EP | 1 228 938 | 8/2002 |
| FR | 2 462 323 | 2/1981 |
| JP | 2004-161039 | 6/2004 |
| JP | 2004-237784 | 8/2004 |
| JP | 2004-291661 | 10/2004 |

* cited by examiner

*Primary Examiner*—Frank B Vanaman
(74) *Attorney, Agent, or Firm*—W. F. Fasse; W. G. Fasse (57) ABSTRACT

A seat carriage body comprises a front leg, a rear leg, a push rod, and position fixing means. An upper end of the front leg is turnably connected to an upper end of the rear leg through a first shaft. A front end member of the push rod is connected to the front leg such that it can be displaced along the front leg at the time of a folding operation. A middle part of the push rod is turnably connected to the rear leg through a second shaft. The position fixing means fixes a positional relation among the front leg, the rear leg and the push rod in both open and folded states.

12 Claims, 7 Drawing Sheets

FOLDABLE CARRIAGE BODY FOR CARRYING A SEAT

BACKGROUND OF THE INVENTION

1. Field of the Invention

The present invention relates to a carriage body which carries a seat and more particularly, to a folding seat carriage body having a simple structure.

2. Description of the Background Art

The carriage body for carrying a seat includes a baby carriage as its one example. Folding baby carriages are disclosed in Japanese Unexamined Patent Publication No. 2004-161039, Japanese Unexamined Patent Publication No. 2004-237784, and Japanese Unexamined Patent Publication No. 2004-291661, for example. The baby carriage disclosed in each of the above documents is folded such that a front wheel and a rear wheel come close to each other and it can stand by itself in a folded state.

According to the baby carriage disclosed in each of the documents, it is desired to reduce the number of frames constituting a basic structure to simplify its structure.

SUMMARY OF THE INVENTION

It is an object of the present invention to provide a foldable carriage body for carrying a seat, called a folding seat carriage body herein, in which the number of frames constituting a basic structure is reduced.

A folding seat carriage body according to the present invention comprises a front leg having a front wheel, a rear leg having a rear wheel, a push rod handled when the carriage body is moved, and position fixing means. An upper end of the rear leg is turnably connected to an upper end of the front leg. A front end of the push rod is connected to the front leg and a middle part thereof is turnably connected to the rear leg. The front end of the push rod is connected to the front leg in such a manner that it can be relatively displaced along the front leg at the time of a folding operation in which the front wheel and the rear wheel come close to each other. The position fixing means fixes a positional relation among the front leg, the rear leg and the push rod in both open and folded states.

According to the folding seat carriage body having the above constitution, since its basic structure consists of the front leg, the rear leg and the push rod, the number of frames constituting the basic structure can be reduced.

According to one embodiment, the seat carriage body comprises a seat supporting member fixed to the push rod so as to support a seat from beneath. In this case, the seat may be fixed to the seat supporting member to be mounted thereon. Alternatively, the seat may be detachably mounted on the seat supporting member.

According to the embodiment in which the seat is detachably mounted on the seat supporting member, it is preferable that the seat can be mounted on the seat supporting member in both forward-looking and backward-looking states. Thus, the carriage body can be switched between a backside pushing manner and a face-to-face pushing manner according to need.

According to one embodiment, the push rod has a receipt hole penetrating in a vertical direction so as to receive the front leg, in its front end. The front leg slides in the receipt hole when the seat carriage body is folded.

The position fixing means has a constitution to fix a cross angle between the push rod and the rear leg, for example. According to another embodiment, position fixing means may have a constitution to fix a cross angle between a front leg and a rear leg, or have a constitution to fix a cross angle between a front leg and a push rod.

As one example of the constitution to fix the cross angle between the push rod and the rear leg, the position fixing means comprises a lock member which can be displaced along the push rod in the vertical direction and a plurality of latch parts fixed to the rear leg so as to engage with the lock member.

DESCRIPTION OF THE PREFERRED EMBODIMENTS

Figure 1:
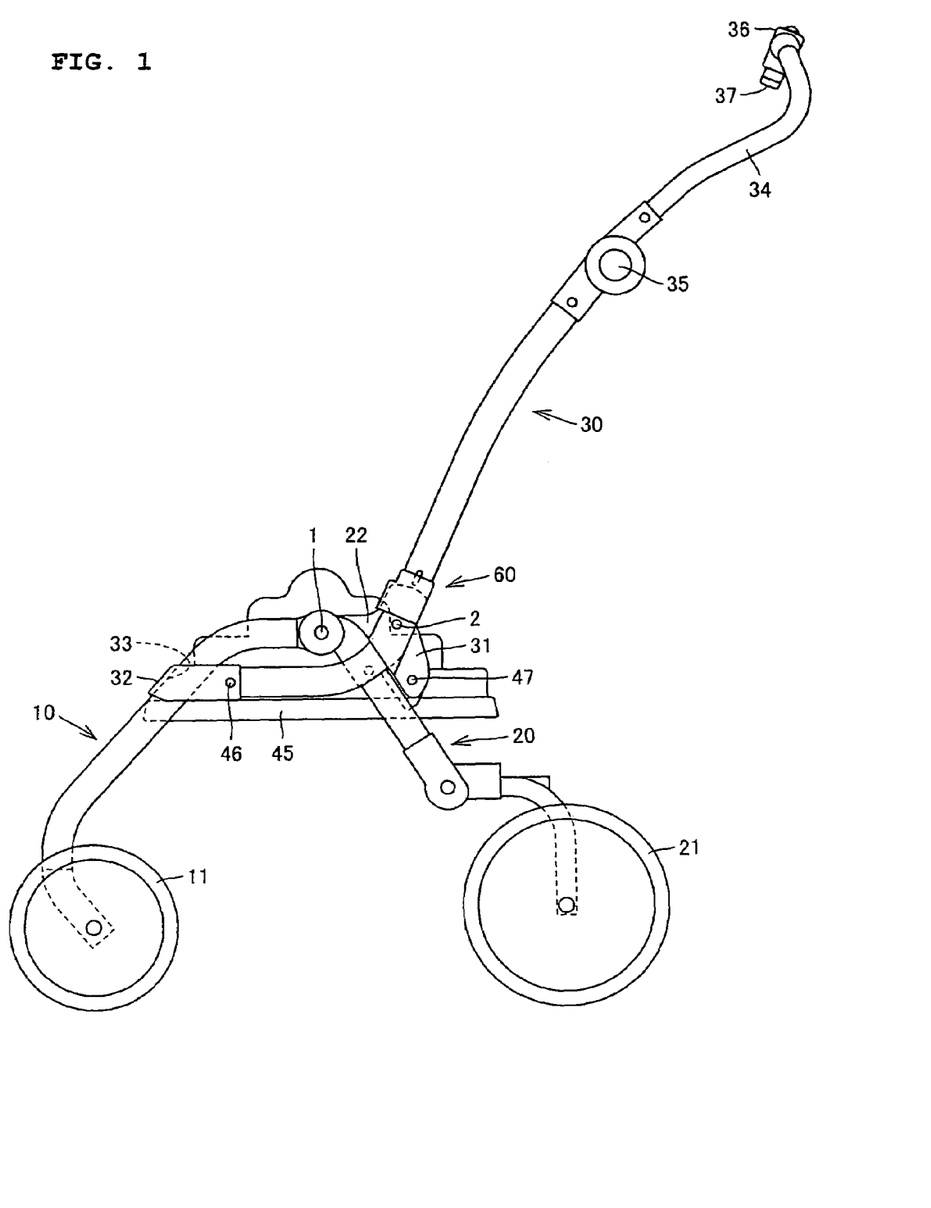
FIG. 1 is a side view showing a seat carriage body according to one embodiment of the present invention.
Figure 2:
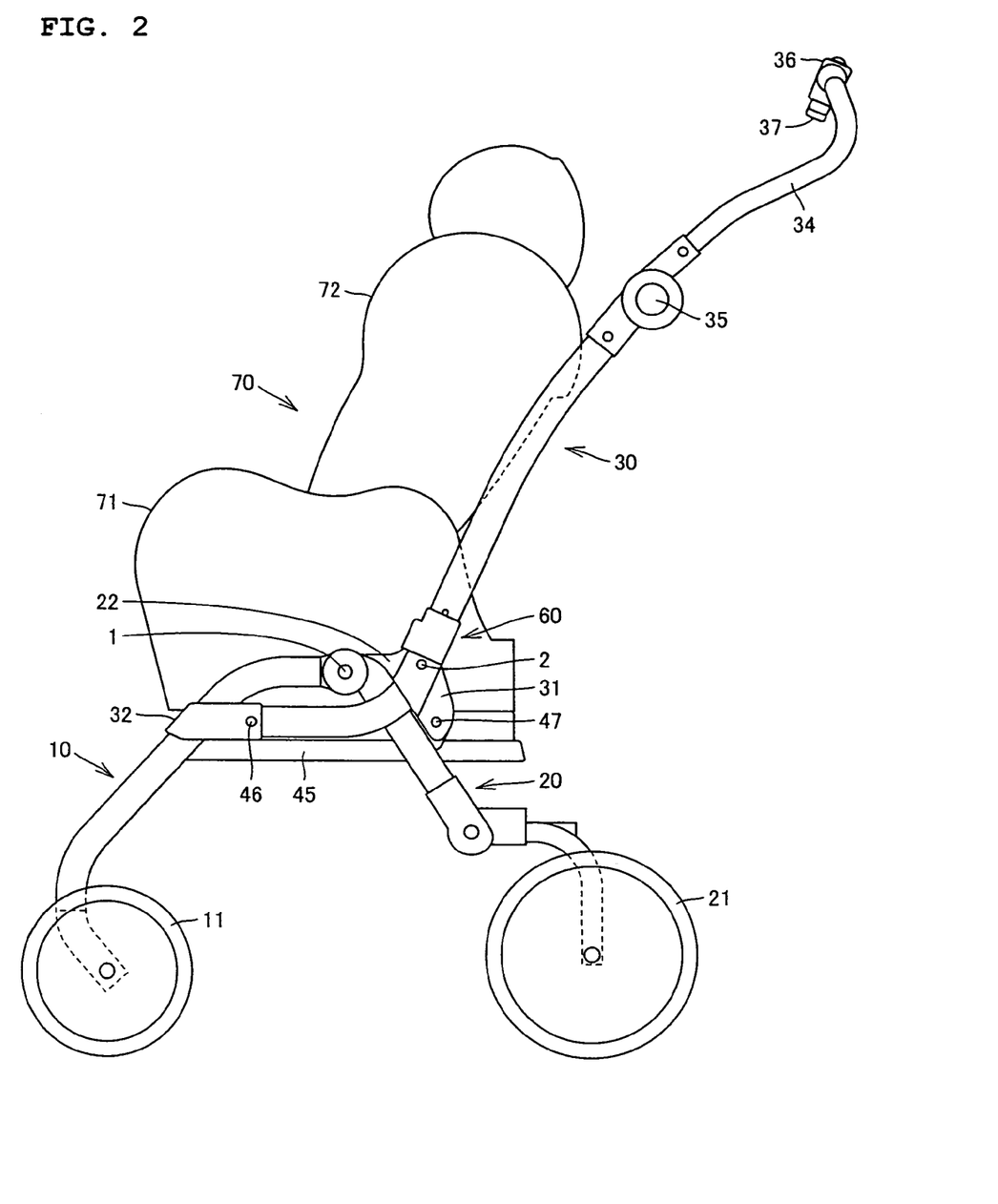
FIG. 2 is a side view showing the seat carriage body in which a seat body is mounted in a forward-looking state.
Figure 3:
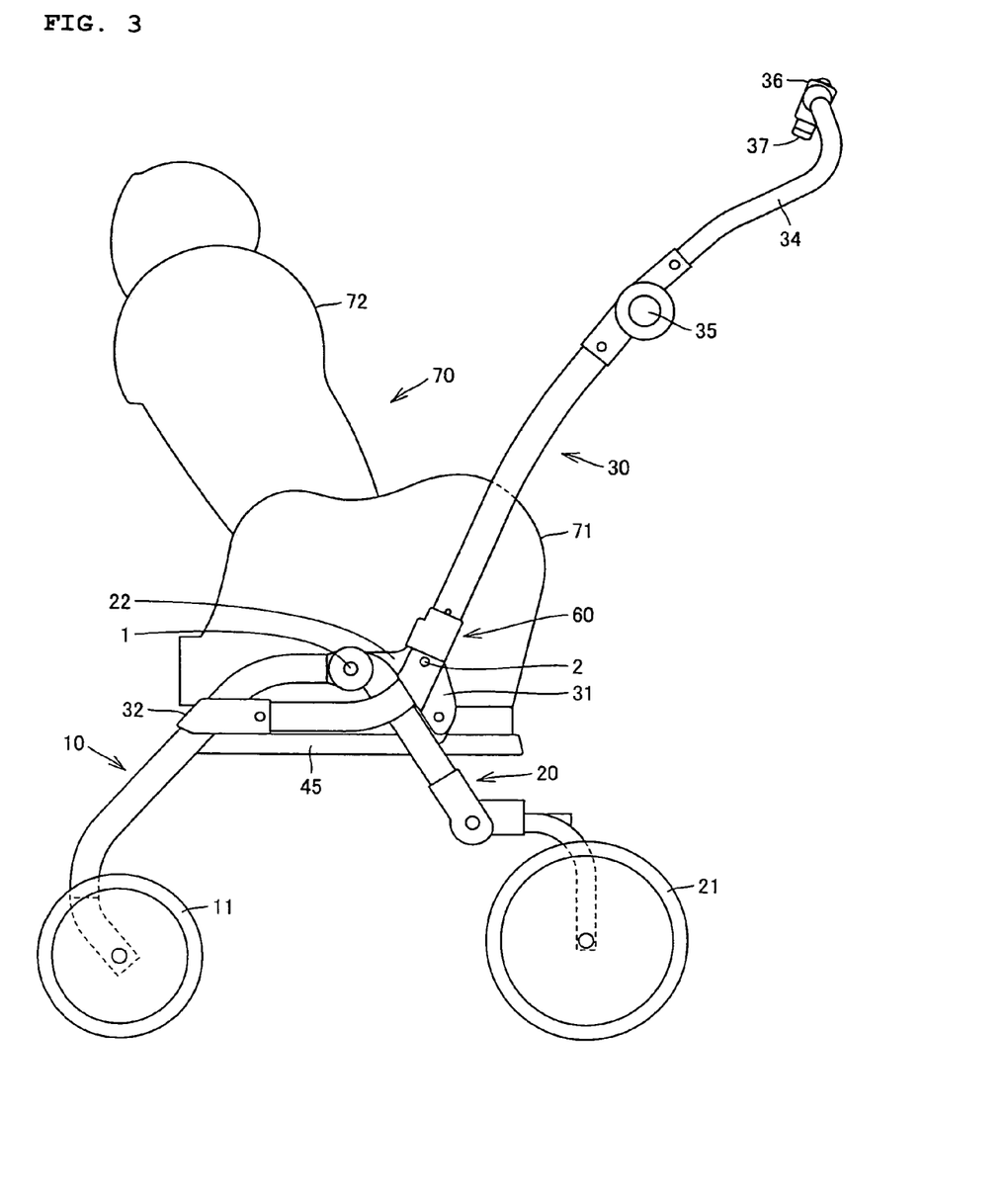
FIG. 3 is a side view showing the seat carriage body in which the seat body is mounted in a backward-looking state.

FIGS. 1 to 4 show an entire folding seat carriage body according to one embodiment of the present invention. The folding seat carriage body carries a seat body 70. According to the illustrated embodiment, the seat body 70 is detachably mounted on the carriage body in both forward-looking and backward-looking states. FIG. 2 shows a state in which the seat body 70 is mounted in the forward-looking state such that a mother and the like moves the carriage body from the backside of a baby seated on a seat. FIG. 3 shows a state in which the seat body 70 is mounted in the backward-looking state such that the mother and the like moves the carriage body in a face-to-face manner with the baby seated on the seat.

Figure 4:
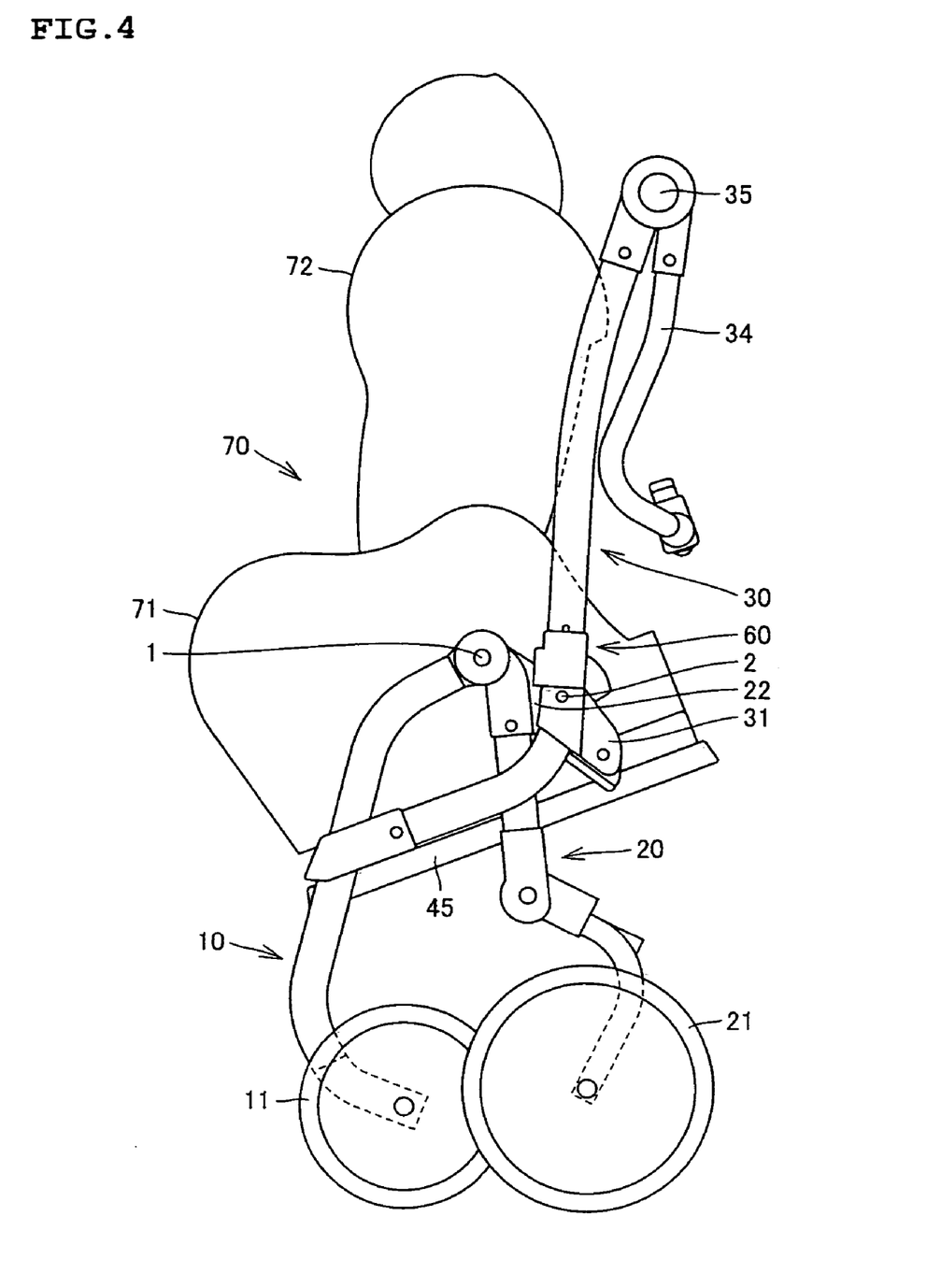
FIG. 4 is a side view showing the seat carriage body folded with the seat body mounted thereon.

FIG. 4 shows a state in which the seat carriage body is folded. As shown in FIG. 4, in the folded state, a front wheel 11 and a rear wheel 12 come close to each other such that the seat carriage body can stand by itself. In addition, the seat carriage body can be folded with the seat body 70 mounted thereon. As can be clearly understood by comparing FIG. 2 with FIG. 3, the shape of the seat body 70 is the same in both open state and folded state of the seat carriage body. That is, although the seat body 70 comprises a seat 71 and a backrest 72, an angle between the seat 71 and the backrest 72 is the same in both open state and folded state of the seat carriage body.

When the seat body 70 is mounted on the seat carriage body, the seat carriage body can be used as a baby carriage. In addition, when the seat body 70 is removed from the seat carriage body and mounted on a seat of a car, it can be used as a child-car seat. Furthermore, when the seat body 70 is removed from the seat carriage body and put in a room, it can be used as a child seat.

Figure 5:
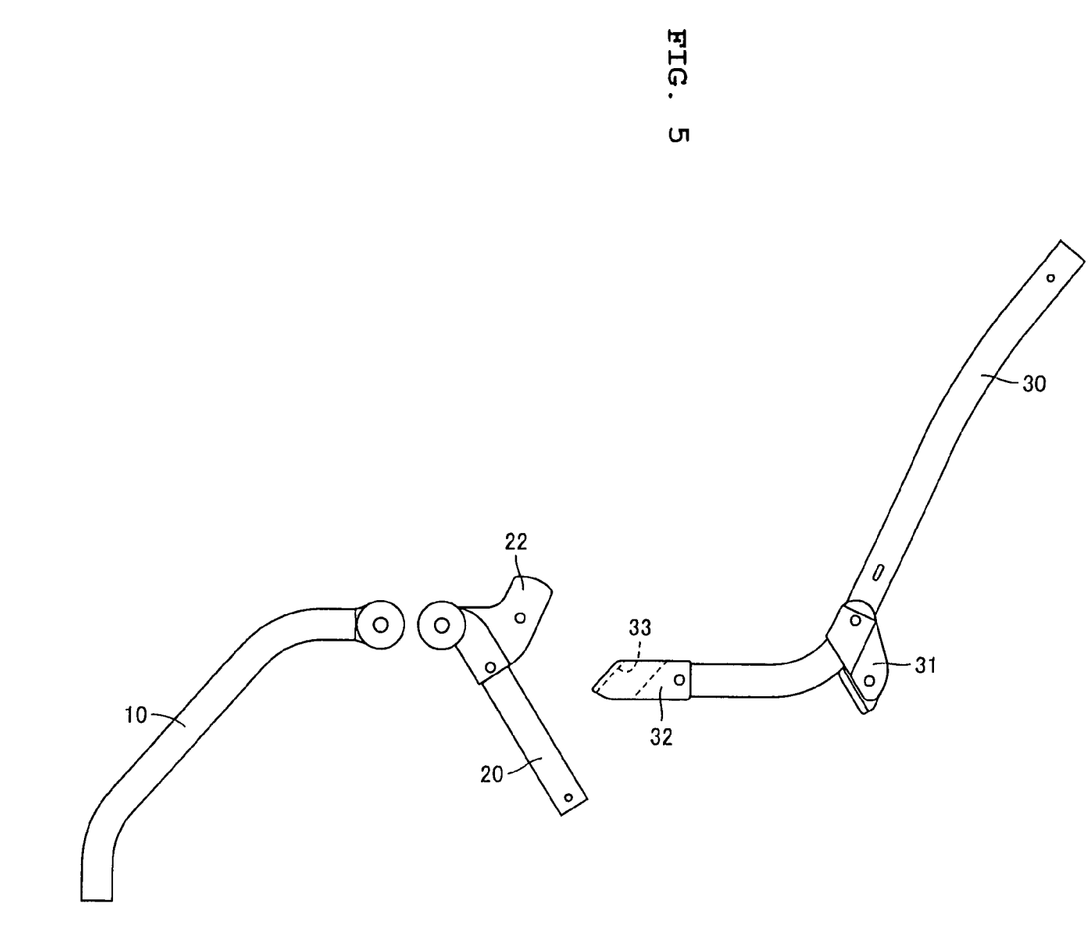
FIG. 5 is a side view showing each of a front leg, a rear leg and a push rod separately.
Figure 6:
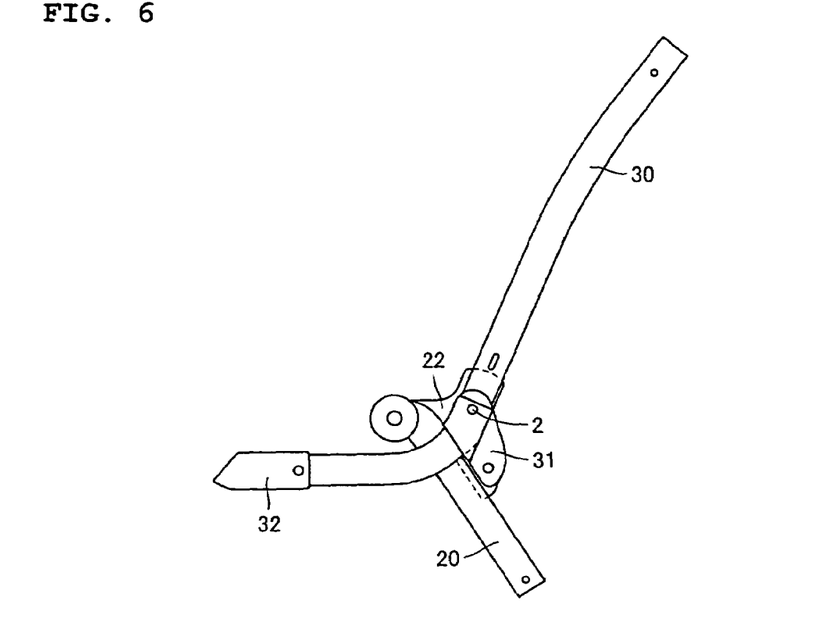
FIG. 6 is a side view showing a state in which the rear leg and the push rod are connected.

A basic structure of the seat carriage body will be described with reference to FIGS. 1, 5 and 6. The seat carriage body comprises a front leg 10 having the front wheel 11, a rear leg 20 having the rear wheel 21, a push rod 30 handled when the carriage body is moved, and position fixing means 60 for fixing a positional relation among the front leg 10, the rear leg 20 and the push rod 30.

An upper end of the front leg 10 and an upper end of the rear leg 20 are turnably connected through a first shaft 1. The push rod 30 has a front end member 32 at its front end and this front end member 32 is connected to the front leg 10 so that it can be displaced along the front leg 10 at the time of the folding operation. More specifically, the front end member 32 has a receipt hole 33 penetrating in a vertical direction as shown in FIG. 5 and the front leg 10 can relatively slide in the receipt hole 33 in the vertical direction.

A middle part of the push rod 30 is turnably connected to the rear leg 20 through a second shaft 2. More specifically, as shown in FIG. 5, the rear leg 20 has an upper plate 22 at its upper end. The push rod 30 has a middle plate 31 at its middle part. The upper plate 22 of the rear leg 20 and the middle plate 31 of the push rod 30 are turnably connected through the second shaft 2.

The position fixing means or device 60 according to the illustrated embodiment fixes a cross angle between the push rod 30 and the rear leg 20 in both open state and folded state of the seat carriage body. As another embodiment, position fixing means may fix a cross angle between a front leg and a rear leg or may fix a cross angle between a front leg and a push rod. In conclusion, the relation fixing means only has to fix a triangle formed with a connection point between the front end member 32 of the push rod 30 and the front leg, the first shaft 1 and the second shaft 2. The position fixing means will be described in detail below.

The push rod 30 has an inverted U-shaped handle part 34 which is turnably provided at its upper end through a connection shaft 35. In the open state of the seat carriage body shown in FIGS. 1 and 2, the handle part 34 is provided to extend the push rod 30 upward. Meanwhile, in the folded state shown in FIG. 4, the handle part 34 is bent along a lower part of the push rod 30 so that a height of the seat carriage body in the folded state is reduced.

The position fixing means 60 will be described in detail with reference to FIGS. 7 to 9 hereinafter. In addition, in FIGS. 8 and 9, it is to be noted that each component regarding the position fixing means 60 is schematically shown and it is different from an actual shape.

The illustrated position fixing means 60 fixes the cross angle between the push rod 30 and the rear leg 20 and as its concrete constitution, it comprises a lock member 61 provided so that it can be displaced along the push rod 30 in the vertical direction and latch parts 62 and 63 provided in the upper plate 22 of the rear leg 20 so that they can engage with the lock member 61. As shown in FIG. 8, when the lock member 61 is engaged with the latch part 62, the triangle formed with the connection point between the push rod 30 and the front leg 10, the first shaft and the second shaft is fixed, so that the open state of the seat carriage body can be fixed.

Figure 9:
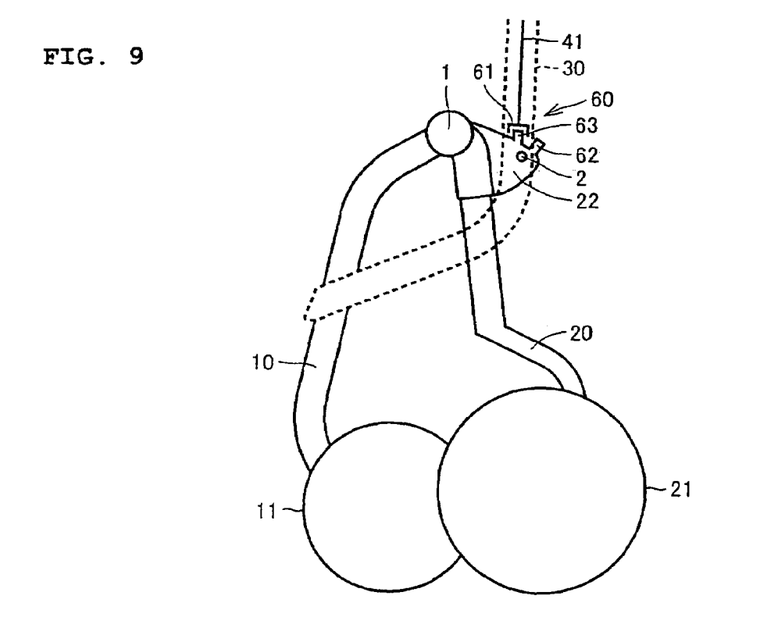
FIG. 9 is a view showing the position fixing means for fixing the seat carriage body in a folded state.

As shown in FIG. 9, when the lock member 61 is engaged with the other latch part 63, the above triangle in the folded state is fixed, so that the folded state of the seat carriage body is fixed.

Figure 7:
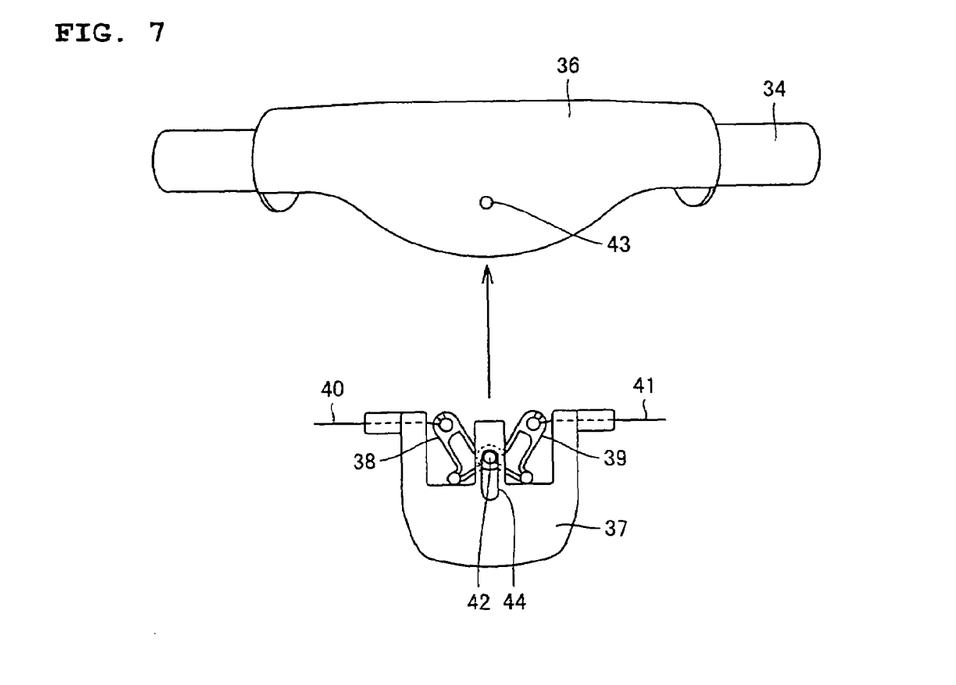
FIG. 7 is a view showing operating means for operating a lock member.
Figure 8:
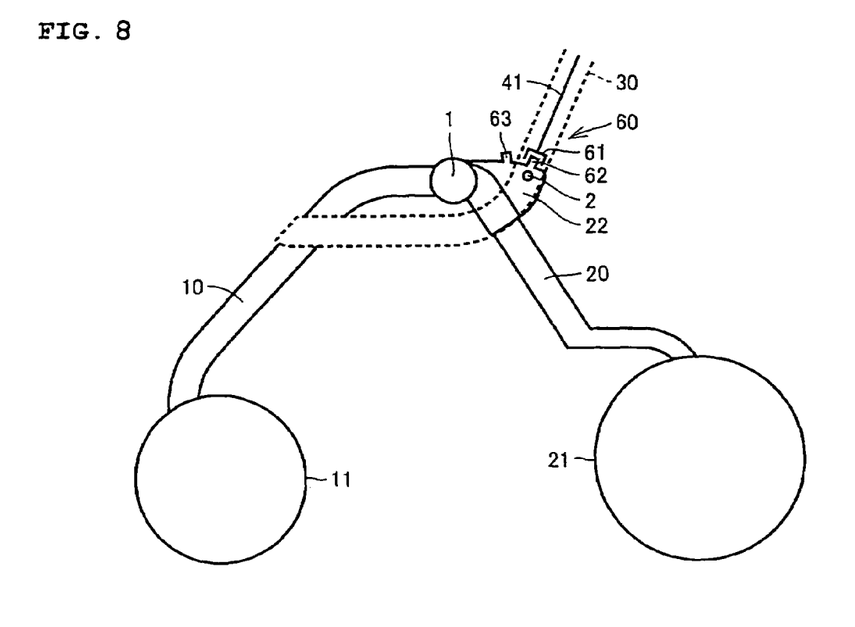
FIG. 8 is a view showing position fixing means for fixing the seat carriage body in an open state.

FIG. 7 shows operating means for operating the lock member 61. As shown in FIG. 7, a mounting member 36 having a cavity at its lower part is fixed to the center of the inverted U-shaped handle part 34 positioned at an upper part of the push rod 30. The mounting member 36 has a mounting hole 43 which receives a fixing shaft 42.

An operation member 37 incorporated in the cavity of the mounting member 36 has a long hole 44 which receives the fixing shaft 42. Since the long hole 44 is long in the vertical direction, the operation member 37 can be displaced in the vertical direction.

Two turn members 38 and 39 each having three top points are turnably mounted on the fixing shaft 42. Among three top points of each of the turn members 38 and 39, the first top point is connected to the fixing shaft 42 and the second top point abuts on the operation member 37 and the third top point is connected to wires 40 or 41. The wires 40 and 41 extend along the pair of rods 30 positioned both sides of the seat carriage body, and their lower ends are connected to the pair of lock members 61 serving as one component of the position fixing means 60. The pair of lock members 61 positioned on both sides is constantly forced to be moved downward by a spring although it is not shown. Therefore, one turn member 38 is forced to be turned counterclockwise in the drawing and the other turn member 39 is forced so as to be turned clockwise in the drawing through the wires 40 and 41. Thus, the operation member 37 is constantly brought to the lower position.

For example, when the seat carriage body in the open state is to be folded, the operation member 37 is pinched and brought to an upper position. Then, the lock member 61 is pulled by the wires 40 and 41 and moved upward and disengaged from one latch part 62. Since the cross angle between the rear leg 20 and the push rod 30 can be changed in this state, the seat carriage body is folded so that the front wheel 11 and the rear wheel 21 may come close to each other. At the time of this folding operation, the front leg 10 slides in the receipt hole 33 of the front end member 32 of the push rod 30 by a certain distance.

After the seat carriage body is folded into a certain folded state, the operation member 37 is released. Then, the lock member 61 is forced by the spring to be moved downward and engaged with the other latch 63, whereby the folded state of the seat carriage body is fixed.

As shown in FIGS. 1 to 4, the seat carriage body comprises a seat supporting member 45 which supports the seat 71 of the seat body 70 from beneath. The seat supporting member 45 is fixed to the push rod 30 by fixing shafts 46 and 47. The seat body 70 is detachably mounted on the seat supporting member 45. In addition, as described above, the seat body 70 can be mounted on the seat supporting member 45 in both forward-looking and backward-looking states. Furthermore, as shown in FIG. 4, the seat carriage body can be folded with the seat body 70 mounted on the seat supporting member 45.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied for a seat carriage body having a very simple structure.

What is claimed is:

1. A foldable carriage body adapted to carry a seat, said carriage body comprising:
   a front leg having a front wheel;
   a rear leg having a rear wheel and an upper end pivotally connected, at a first axis, to an upper end of said front leg;
   a push rod having a front end with a hole therein slidably receiving said front leg so that said front end of said push rod is slidable along said front leg during a folding operation in which said front wheel and said rear wheel come close to each other, and said push rod further having a middle part pivotally connected to said rear leg at a second axis apart from said first axis;

a position fixing device adapted to fix a positional relation among said front leg, said rear leg and said push rod in both open and folded states; and a seat supporting member fixed to said push rod so as to be adapted to support the seat from beneath.

2. The foldable carriage body according to claim 1, further in combination with the seat mounted on said seat supporting member.

3. The foldable carriage body according to claim 2, wherein said seat includes a seat part and a backrest part, and wherein a shape of said seat including an angle between said seat part and said backrest part is the same in both said open and folded states of said carriage body in combination with said seat.

4. The foldable carriage body according to claim 2, wherein said seat is detachably mounted on said seat supporting member.

5. The foldable carriage body according to claim 4, wherein said seat is selectably mountable on said seat supporting member in both forward-looking and backward-looking states.

6. The foldable carriage body according to claim 1, wherein said position fixing device is adapted to fix a cross angle between said push rod and said rear leg.

7. The foldable carriage body 2 according to claim 6, wherein said position fixing device comprises a lock member which can be displaced along said push rod in an upward-downward direction and a plurality of latch parts fixed to said rear leg so as to engage with said lock member.

8. The foldable carriage body according to claim 1, wherein said hole penetrates through said front end of said push rod across a longitudinal extension axis of said front end of said push rod so that said front leg crosses said longitudinal extension axis of said front end of said push rod as said front leg slidably extends through said hole.

9. The foldable carriage body according to claim 1, wherein said push rod passes below said first axis.

10. The foldable carriage body according to claim 1, wherein said rear leg includes a rear leg rod member and a rear leg plate member fixed to and protruding from said rear leg rod member, and said second axis is defined by a second shaft pivotally connecting said push rod with said rear leg plate member.

11. The foldable carriage body according to claim 10, wherein said first axis is defined by a first shaft extending parallel to said second shaft, and said rear leg plate member provides a fixed positional relationship of said first shaft, said second shaft and said rear leg relative to one another.

12. The foldable carriage body according to claim 1, wherein said position fixing device comprises position fixing means for selectively releasably fixing the positional relation among said front leg, said rear leg and said push rod in both said open and folded states.

* * * * *